(12) United States Patent
Vassallo et al.

(10) Patent No.: US 9,043,155 B2
(45) Date of Patent: May 26, 2015

(54) MATCHING PURSUIT-BASED APPARATUS AND TECHNIQUE TO CONSTRUCT A SEISMIC SIGNAL USING A PREDICTED ENERGY DISTRIBUTION

(75) Inventors: Massimiliano Vassallo, Brighton (GB); Ali Özbek, Cambridge (GB); Dirk-Jan Van Manen, Reigate (GB); Anthony D. Curtis, Lamberhurst (GB); Kurt Eggenberger, Crawley (GB)

(73) Assignee: WESTERNGECO L.L.C., Houston, TX (US)

( * ) Notice: Subject to any disclaimer, the term of this patent is extended or adjusted under 35 U.S.C. 154(b) by 590 days.

(21) Appl. No.: 13/248,062

(22) Filed: Sep. 29, 2011

(65) Prior Publication Data

US 2012/0089337 A1    Apr. 12, 2012

Related U.S. Application Data

(60) Provisional application No. 61/390,706, filed on Oct. 7, 2010.

(51) Int. Cl.
*G06F 19/00* (2011.01)
*G01V 1/36* (2006.01)
*G01V 99/00* (2009.01)
*G01V 1/32* (2006.01)
(Continued)

(52) U.S. Cl.
CPC .............. *G01V 99/005* (2013.01); *G01V 1/364* (2013.01); *G01V 1/32* (2013.01); *G01V 1/28* (2013.01); *G01V 1/00* (2013.01); *G01V 1/02* (2013.01); *G01V 1/003* (2013.01)

(58) Field of Classification Search
CPC ....... G01V 99/005; G01V 1/32; G01V 1/364; G01V 1/28; G01V 1/00; G01V 1/003; G01V 1/02
USPC .................... 702/2, 11, 14, 17, 18; 703/2, 10; 367/44, 45, 46, 43, 73, 52; 166/369
See application file for complete search history.

(56) References Cited

U.S. PATENT DOCUMENTS 5,850,622 A * 12/1998 Vassiliou et al. ................. 702/17
5,971,095 A * 10/1999 Ozbek ........................... 181/112

(Continued)

FOREIGN PATENT DOCUMENTS

GB           2450122        12/2008

OTHER PUBLICATIONS

Curry, "Interpolation with Fourier-Radial Adaptive Thresholding," SEG Houston International Exposition and Annual Meeting, 2009: pp. 3259-3263.

(Continued)

*Primary Examiner* — Carol S Tsai

(57) ABSTRACT

A technique includes processing seismic data indicative of samples of at least one measured seismic signal in a processor-based machine to, in an iterative process, determine basis functions, which represent a constructed seismic signal. The technique includes in each iteration of the iterative process, selecting another basis function of the plurality of basis functions. The selecting includes based at least in part on the samples and a current version of the constructed seismic signal, determining a cost function; and interpreting the cost function based at least in part on a predicted energy distribution of the constructed seismic signal to select the basis function.

22 Claims, 4 Drawing Sheets

(51) Int. Cl.
*G01V 1/28* (2006.01)
*G01V 1/00* (2006.01)
*G01V 1/02* (2006.01)

(56) References Cited

U.S. PATENT DOCUMENTS

| | | | |
|---|---|---|---|
| 6,035,255 A * | 3/2000 | Murphy et al. | 702/11 |
| 6,044,328 A * | 3/2000 | Murphy et al. | 702/11 |
| 6,070,125 A * | 5/2000 | Murphy et al. | 702/11 |
| 6,366,857 B1 * | 4/2002 | Bird et al. | 702/2 |
| 6,839,658 B2 * | 1/2005 | Causse et al. | 702/182 |
| 7,065,449 B2 * | 6/2006 | Brewster et al. | 702/5 |
| 7,751,277 B2 | 7/2010 | Schonewille | |
| 7,817,495 B2 | 10/2010 | Ozbek et al. | |
| 8,031,555 B2 * | 10/2011 | Schuster | 367/38 |
| 8,553,497 B2 * | 10/2013 | Krohn | 367/45 |
| 8,554,484 B2 | 10/2013 | van Manen et al. | |
| 8,605,543 B2 * | 12/2013 | Ray et al. | 367/51 |
| 2009/0296523 A1 | 12/2009 | Ozbek et al. | |
| 2010/0002541 A1 | 1/2010 | Ozdemir et al. | |
| 2010/0124368 A1 | 5/2010 | Ye et al. | |
| 2010/0211320 A1 | 8/2010 | Vassallo et al. | |
| 2010/0211322 A1 * | 8/2010 | Vassallo et al. | 702/14 |
| 2010/0211323 A1 | 8/2010 | Ozdemir et al. | |
| 2011/0002192 A1 | 1/2011 | Ozbek et al. | |
| 2011/0054857 A1 * | 3/2011 | Moguchaya | 703/2 |
| 2011/0069581 A1 * | 3/2011 | Krohn | 367/43 |
| 2012/0089377 A1 * | 4/2012 | Erhard et al. | 703/1 |
| 2012/0316844 A1 * | 12/2012 | Shah et al. | 703/2 |

OTHER PUBLICATIONS

Gülünay, "Seismic trace interpolation in the Fourier transform domain," Geophysics, Jan.-Feb. 2003, vol. 68(1): pp. 355-369.
Spitz, "Seismic trace interpolation in the F-X domain," Geophysics, Jun. 1991, vol. 56(6): pp. 785-794.
Trad, "Five-dimensional interpolation: Recovering from acquisition constraints," Geophysics, Nov.-Dec. 2009, vol. 74(6): pp. V123-V132.
Vassallo et al., "Crossline wavefield reconstruction from multicomponent streamer data: Part 1—Multichannel interpolation by matching pursuit (MIMAP) using pressure and its crossline gradient," Geophysics, Nov.-Dec. 2010, vol. 75(6): pp. WB53-WB67.
Xu et al., "Antileakage Fourier transform for seismic data regularization," Geophysics, Jul.-Aug. 2005, vol. 70(4): pp. V87-V95.
Zwartjes et al., "Fourier reconstruction of nonuniformly sampled, aliased seismic data," Geophysics, Jan.-Feb. 2007, vol. 72(1): pp. V21-V32.
International Search Report and Written Opinion of PCT Application No. PCT/US201/055190 dated May 4, 2012: pp. 1-9.

* cited by examiner

MATCHING PURSUIT-BASED APPARATUS AND TECHNIQUE TO CONSTRUCT A SEISMIC SIGNAL USING A PREDICTED ENERGY DISTRIBUTION

This application claims the benefit under 35 U.S.C. §119 (e) to U.S. Provisional Patent Application Ser. No. 61/390,706, entitled, "ESTIMATE AND USE OF LIKELIHOOD OF THE ENERGY DISTRIBUTION IN MULTICHANNEL MATCHING PURSUIT BASED METHODS," which was filed on Oct. 7, 2010, and is hereby incorporated by reference in its entirety.

BACKGROUND

The invention generally relates to matching pursuit-based apparatus and technique to construct a seismic signal using a predicted energy distribution.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes processing seismic data indicative of samples of at least one measured seismic signal in a processor-based machine to, in an iterative process, determine basis functions, which represent a constructed seismic signal. The technique includes in each iteration of the iterative process, selecting another basis function of the plurality of basis functions. The selecting includes based at least in part on the samples and a current version of the constructed seismic signal, determining a cost function; and interpreting the cost function based at least in part on a predicted energy distribution of the constructed seismic signal to select the basis function.

In another embodiment of the invention, a technique includes processing seismic data indicative of samples of at least one measured seismic signal in a processor-based machine to determine basis functions, which represent a constructed seismic signal based on matching pursuit-based technique. The technique includes basing the determination of the basis functions at least in part on a predicted energy distribution of the constructed seismic signal.

In another embodiment of the invention, a system includes an interface to receive seismic data indicative of samples of at least one measured seismic signal and a processor. The processor is adapted to, in an iterative process, determine basis functions, which represent a constructed seismic signal. In each iteration of this iterative process, the processor selects another basis function of the plurality of basis functions in a technique that includes, based at least in part on the samples and a current version of the constructed seismic signal, determining a cost function and interpreting the cost function based at least in part on a predicted energy distribution of the constructed seismic signal to select the basis function.

In yet another embodiment of the invention, an article includes a computer readable storage medium that stores instructions that when executed by at least one processor cause said the processor(s) to process seismic data indicative of samples of at least one measured signal to, in an iterative process, determine basis functions, which represent a constructed seismic signal; and in each iteration of the iterative process, select another basis function of the plurality of basis functions. The selection includes, based at least in part on the samples and a current version of the constructed seismic signal, determining a cost function and interpreting the cost function based at least in part on a predicted energy distribution of the constructed seismic signal to select the basis function.

Advantages and other features of the invention will become apparent from the following drawing, description and claims.

DETAILED DESCRIPTION

Figure 1:
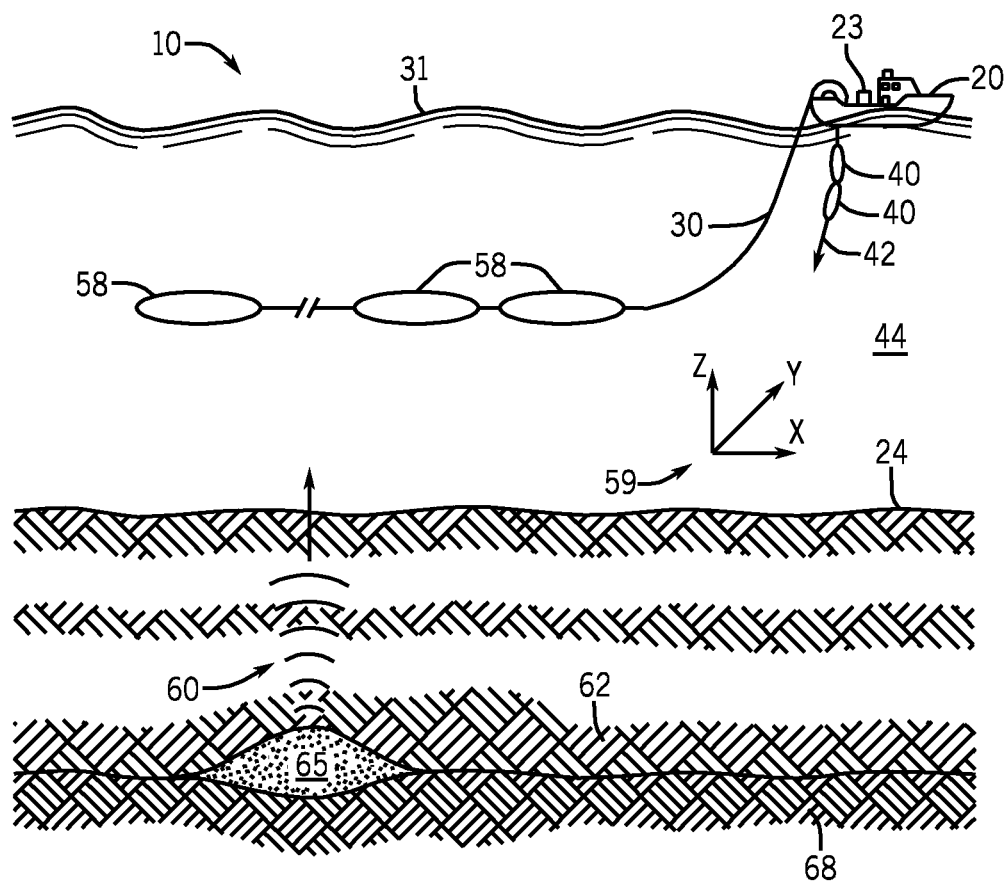
FIG. 1 is a schematic diagram of a marine-based seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure derivative with respect to the inline direction, and another one of the pressure gradient sensors may acquire, at a particular point, seismic data indicative of the pressure derivative with respect to the vertical direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the seismic waves that are received and sensed by the seismic sensors 58 include "up going" seismic waves that propagate to the sensors 58 after reflections at the subsurface, as well as "down going" seismic waves that are produced by reflections of the pressure waves 60 from an air-water boundary, or free surface 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

It may be useful to process the acquired seismic data for purposes of determining interpolated or extrapolated wavefield measurements, which were not acquired by the sensors. For example, quite often, sampled seismic data contains insufficient information to produce an unaliased construction of a seismic wavefield in a given direction. For example, the spread of streamers 30 may include streamers 30 that are spaced apart in the crossline (y) direction, which means that the seismic sensors are rather sparsely spaced apart in the crossline direction, as compared to the inline (x) spacing of the seismic sensors. As a result, the pressure wavefield may be relatively densely sampled in the inline direction while being sparsely sampled in the crossline direction to such a degree that the sampled pressure wavefield may be aliased in the crossline direction. An interpolation technique, such as a matching pursuit-based technique, may be used for purposes of interpolating the pressure wavefield in the crossline direction. An example of the use of a matching pursuit-based technique to interpolate the pressure wavefield in an undersampled direction is described in, for example, U.S. patent application Ser. No. 12/370,762, entitled "INTERPOLATING A PRESSURE WAVEFIELD IN AN UNDERSAMPLED DIRECTION," which was filed on Feb. 13, 2009, and is hereby incorporated by reference in its entirety.

In general, the matching pursuit-based technique is used to determine a set of basis functions, which when added together represent a sampled signal. The matching pursuit-based technique iteratively determines the basis functions through an optimization procedure. In general, the matching pursuit-based technique reconstructs a spatially contiguous representation of a seismic signal so that a denser sampling of the signal may be obtained.

For multi-component marine seismic acquisition, a multiple channel, matching pursuit-based technique may similarly be used to make use of pressure in its horizontal gradient to de-alias seismic signals in the crossline direction. For example, a multiple channel, matching pursuit-based technique, such as the Multichannel Interpolation by Matching Pursuit (MIMAP), may be employed. The MIMAP technique is disclosed in UK Patent Application No. GB 2450122 A, which was published on Dec. 17, 2008, and is hereby incorporated by reference in its entirety.

The MIMAP technique simultaneously uses pressure and the horizontal gradient of pressure as inputs to de-alias seismic signals in the crossline direction. A finer and more general matching pursuit-based technique, making use of more components (i.e., pressure, vertical and horizontal gradients) to achieve joint interpolation and three-dimensional (3-D)

wavefield separation is the Generalized Matching Pursuit (GMP) technique. The GMP technique is disclosed in U.S. Pat. No. 7,817,495, entitled, "JOINTLY INTERPOLATING AND DEGHOSTING SEISMIC DATA," which issued on Oct. 19, 2010, and is hereby incorporated by reference in its entirety.

The GMP technique applies an appropriate forward filter to the basis function(s) before matching the function(s) to every input measurement. In this manner, pursuant to the GMP technique, each basis function is selected in an iterative process after being filtered and matched to the sampled data to allow reconstruction of an unfiltered and de-aliased seismic signal at the desired positions.

There are various other matching pursuit-based techniques that may be used, in accordance with the various embodiments of the invention, which are disclosed herein, such as (as additional non-limiting examples), the matching pursuit-based techniques disclosed in U.S. patent application Ser. No. 12/370,684, entitled, "RECONSTRUCTING SEISMIC WAVEFIELDS," which was filed on Feb. 13, 2009, and is incorporated by reference in its entirety; and U.S. patent application Ser. No. 12/370,710, entitled, "RECONSTRUCTING A SEISMIC WAVEFIELD," which was filed on Feb. 13, 2009, and is hereby incorporated by reference in its entirety.

As can be appreciated by the skilled artisan, any of a number of different sampled seismic signals (acceleration measurements, particle velocity measurements, particle motion measurements, pressure gradients, etc.) may be processed by a matching pursuit-based technique for purposes of deriving a constructed output signal, which also may be any of a number of different seismic signals.

It has been discovered that the matching pursuit-based technique (in any of the above-mentioned forms, for example), when applied to multicomponent data, has significant anti-aliasing potential. More specifically, when the aliased spectral replicas of the multicomponent data do not overlap, a multichannel matching pursuit-based technique allows a relatively accurate determination of basis functions describing datasets that may be subject to very high order aliasing. The assumptions that make this possible (i.e., non-overlapping aliased spectral replicas) are much less restrictive than the assumptions used by most de-aliasing techniques.

Although the multiple channel application has significant anti-aliasing potential, the susceptibility to aliasing is still a significant limitation for the case of a single channel application. Also, in the case of multiple channel inputs, the mentioned assumptions may also fail, and when this happens, the ability of a matching pursuit-based technique to describe the desired signal with the correct set of basis functions becomes slightly weaker. For example, when the order of aliasing increases, the probability of overlapping spectral replicas also increases. In seismic data, this effect makes the high frequency components much more difficult to reconstruct than the low frequency components of the data.

Figure 2:
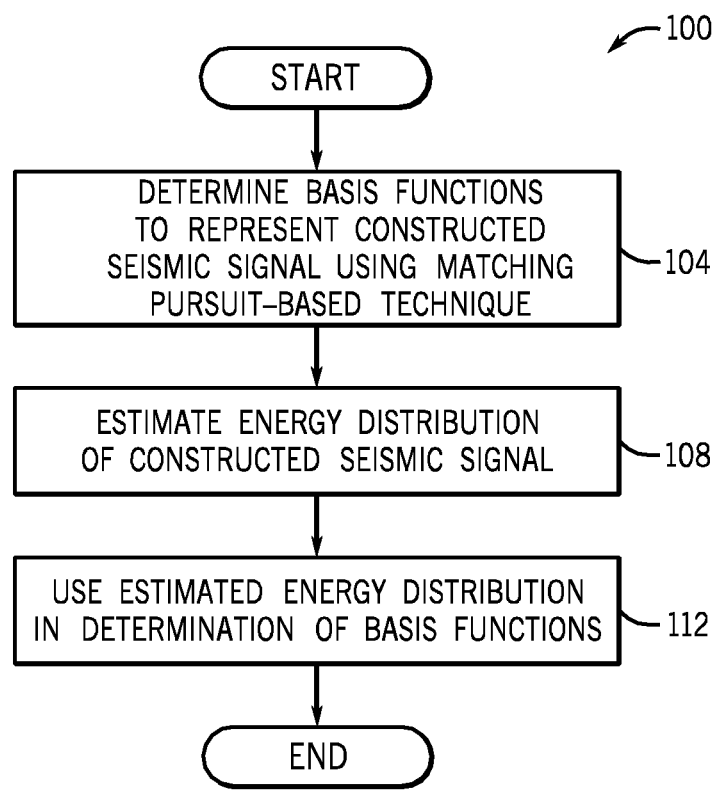
FIGS. 2 and 3 are flow diagrams depicting techniques to use matching pursuit-based techniques to construct seismic signals according to embodiments of the invention.

Referring to FIG. 2, in accordance with embodiments of the invention described herein, a technique 100 may be used, in general, to determine the basis functions pursuant to the matching pursuit-based technique. The technique 100 includes determining (block 104) basis functions to represent a constructed seismic signal using a matching pursuit-based technique, estimating (block 108) an energy distribution of the constructed seismic signal and using (block 112) the estimated energy distribution in the determination of the basis functions. In this regard, the energy distribution estimate, which may be based on prior knowledge or an estimate formed from a particular region of the frequency spectrum (as further described herein) may be used as a likelihood indicator to aid the matching pursuit-based technique in the selection of the correct set of basis functions, as further described below.

As a more specific example, the matching pursuit technique may be the previously mentioned MIMAP technique, which relates to multiple channel interpolation having pressure and its horizontal gradient as inputs. It is noted that the following description may similarly also apply to the GMP matching pursuit-based technique described in previously-mentioned U.S. Pat. No. 7,817,495 with the three components (pressure, horizontal and vertical gradients) as inputs or even two components from any combination of these three components. The MIMAP matching pursuit-based technique describes the seismic signal to be constructed as a summation of basis functions and its horizontal derivatives as the summation of the horizontal derivatives of the same basis functions. The basis functions are determined in an iterative process such that in each iteration, a new basis function is selected to optimally match both the pressure and pressure gradient signals, measured at the sample positions, by minimizing a cost function.

In accordance with some embodiments of the invention, the cost function may be the cost function used to derive the Lomb spectrum. In this manner, in the case of sinusoidal basis functions, the cost function generated by interpolation by matching pursuit (IMAP) with optimal amplitudes in the least square sense corresponds to the Lomb spectrum.

Considering the simplest case of complex exponential basis functions, a signal (called "s(x)") to be interpolated may be described as follows:

$$s(x) = \sum_p [a_p \cos(k_p x) - ib_p \sin(k_p x)], \qquad \text{Eq. 1}$$

and the gradient of the s(x) signal, called "$s_x(x)$," may be described as follows:

$$s_x(x) = \sum_p ik_p [a_p \cos(k_p x) - ib_p \sin(k_p x)], \qquad \text{Eq. 2}$$

where "a" represents the in-phase amplitude of the basis function; "b" represents the quadrature amplitude of the basis function; "k" represents the wavenumber of the basis function; and "p" represents the iteration number.

At iteration 1, at the input positions $x_n$, the basis function that will be selected, removed from the residual at the input positions and added to the output signal at the desired position is the basis function described by the a, b and k parameters, which minimize the following cost function:

$$[a_l, b_l, k_l] = \operatorname*{argmin}_{a,b,k,} \sum_n [\|r_{l-1}(x_n) - a\cos(kx_n) + ib\sin(kx_n)\|^2 + \qquad \text{Eq. 3}$$
$$\lambda \|r'_{l-1}(x_n) - ik(a\cos(kx_n) - ib\sin(kx_n))\|^2],$$

where "n" represents the index to scan all the input positions; "$r_{l-1}$" represents the residual obtained by subtracting from the input data the basis functions determined at the first 1-1 iterations; and "$r'_{l-1}$" represents the same residual determined on the gradient measurements. Moreover, in Eq. 3, "λ" represents a weighted balancing of the impact of the gradient residual on the cost function. For this specific non-limiting example, the minimization is the L2 norm, although other norms may be used, in accordance with other embodiments of the invention.

The a and b parameters may be analytically and optimally determined as a function of the $r_{l-1}$, $r'_{l-1}$ residuals of the wavenumber k and of the input sample positions, as disclosed in Vassallo, M., Ozbek, A., Ozdemir, K. and Eggenberger, K., Crossline Wavefield Reconstruction from Multicomponent Streamer Data: Part 1—Interpolation by Matching Pursuit Using Pressure and Its Crossline Gradient. Geophysics, Vol. 75, No. 6, pp. WB53-WB67, November-December 2010, which is hereby incorporated by reference in its entirety. Therefore, the only remaining parameter to select is the $k_l$ wavenumber, as set forth below:

$$[k_l] = \underset{k}{\mathrm{argmin}} \sum_n \left\| \begin{matrix} r_{l-1}(x_n) - a(r_{l-1}(x_n), r'_{l-1}(x_n), x_n, k)\cos(kx_n) + \\ ib(r_{l-1}(x_n), r'_{l-1}(x_n), x_n, k)\sin(kx_n) \end{matrix} \right\|^2 + \lambda \left\| r'_{l-1}(x_n) - ik \begin{pmatrix} a(r_{l-1}(x_n), r'_{l-1}(x_n), x_n, k)\cos(kx_n) - \\ ib(r_{l-1}(x_n), r'_{l-1}(x_n), x_n, k)\sin(kx_n) \end{pmatrix} \right\|^2. \quad \text{Eq. 4}$$

Using the above-described cost function may not be entirely reliable, however, in such cases as relatively coarse sampling; irregular sampling; particularly low signal-to-noise ratio (SNR) on the measured data; spectral leakage; or noise energy. In this regard, any of the above-described factors may introduce incorrect, or false, minima in the cost function.

However, in accordance with embodiments of the invention described herein, the predicted, or estimated, likely energy distribution of the constructed signal is used in a manner that aids interpretation of the cost function such that the matching pursuit-based technique discriminates between the false minima and the realistic minima. For the example disclosed herein, the basis functions vary with the wavenumber, and the estimated energy distribution may be obtained as a function of the expected spectrum of the constructed signal or an estimate of the spectrum itself. As a non-limiting example, the predicted energy distribution may be used to interpret the cost function by reformulating the cost function, as follows:

$$[k_l] = \underset{k}{\mathrm{argmin}} \Big[ (-a_l^2(r_{l-1}(x_n), x_n, k_l) - b_l^2(r_{l-1}(x_n), x_n, k_l)) \quad \text{Eq. 5}$$

$$(1 + \lambda k^2)\big(1 + \alpha \hat{S}(k)\big) \Big],$$

where "$\hat{S}(k)$" represents the predicted likely energy distribution of the data; and "$\alpha$" represents a weighting parameter that allows the enabling or disabling of the use of the predicted energy distribution or the increase or decrease in the impact of the estimate, depending on how reliable the distribution is expected to be. In this manner, the matching pursuit-based technique is driven by the knowledge of where the $\hat{S}(k)$ estimate indicates that high energy is expected, indicating the most likely positions of the realistic minima and reducing the likelihood of selecting false minima due to aliasing or spectral leakage. Thus, the use of the $\hat{S}(k)$ estimate increases the likelihood of the selected basis functions describing the signal rather than being driven by numerical or sampling artifacts.

For the specific example of Eq. 5, the $\hat{S}(k)$ estimate is used in a weighting window $(1+\alpha\hat{S}(k_l))$. Other weighting windows may be used, in accordance with other embodiments of the invention.

Figure 3:
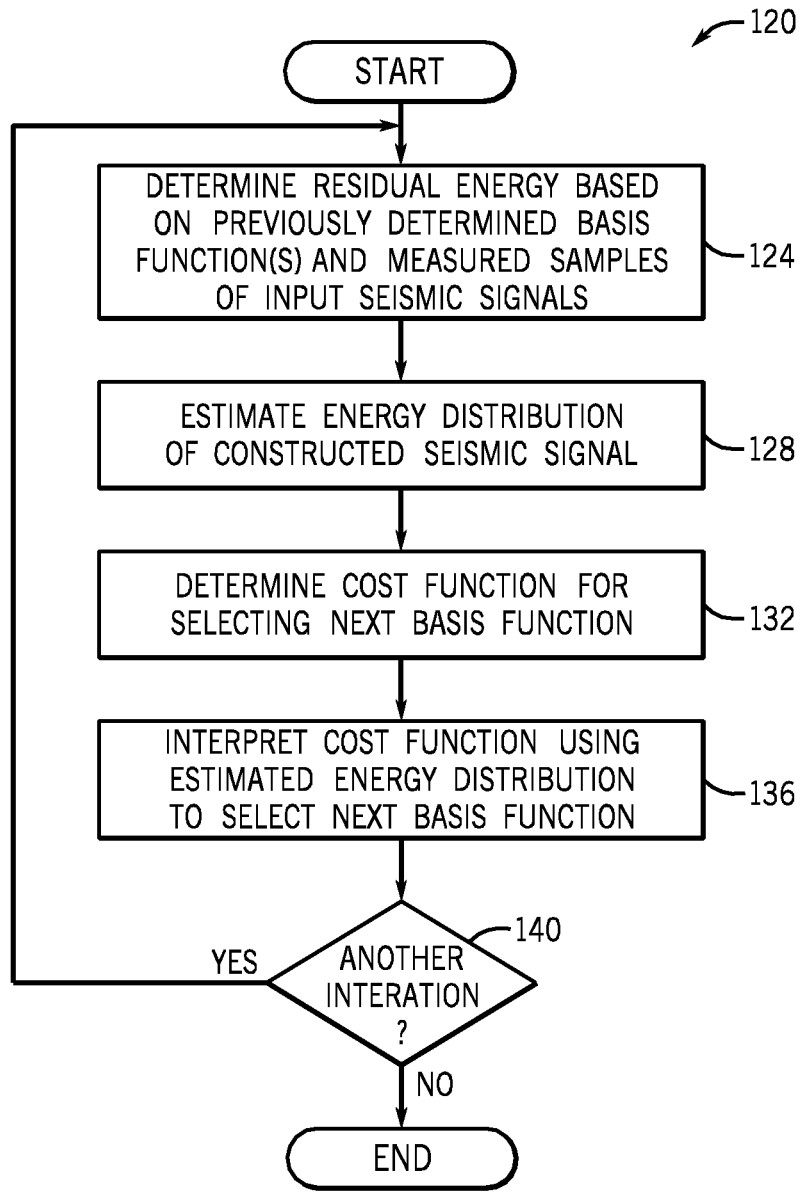

Thus, referring to FIG. 3, in accordance with embodiments of the invention, iterations of the matching pursuit-based technique may proceed as illustrated by a technique 120. Pursuant to the technique 120, a residual energy based on previously-determined basis function(s) and measured samples of input seismic signals are determined (block 124); and the energy distribution of the constructed seismic signal is estimated, pursuant to block 128. Next, the technique 120 includes determining (block 132) a cost function for selecting the next basis function and interpreting (block 136) the cost function using the estimated energy distribution to select the next basis function. Next, a determination is made (diamond 140) whether another iteration is to be performed to determine another basis function, and if so, control returns to block 124. Otherwise, the technique 120 terminates with the complete set of basis functions being determined.

It is noted that the above-described energy estimate may be applied to weight the cost function in the more general case of the GMP matching pursuit-based technique or in any case of multiple channel joint interpolation and deconvolution achieved by applying multiple channel matching pursuit methods to seismic data, resulting in an increased robustness against high order aliasing and reduced resolution. In the case of the GMP, the energy distribution generating the mask describes the energy distribution of the output signal (i.e., the upgoing pressure) and not any of the input measurements (i.e., total pressure and particle motions wavefields). In this manner, the output signal constructed by applying the GMP-based technique does not have the same spectrum of any of the inputs, and the transfer function from any input to the desired output is actually used to model the cost function.

It is thus noted that the systems and techniques that are disclosed herein may be applied to any multiple dimension problem.

When applying MIMAP or GMP-based techniques to seismic data in the frequency space domain, low frequencies are not subject to spatial aliasing. Thus, the information estimated at low frequencies may be extrapolated to high frequencies (linearly extrapolation, for example) for purposes of generating an estimate of the spectrum to aid the MIMAP-based technique to discriminate between signal spectrum related minima and aliased replicas.

The systems and techniques that are disclosed herein may be particularly useful for multiple component seismic interpolation or simultaneous interpolation and deconvolution problems. In this manner, it is likely that at very low frequencies, some of the multicomponent signals (such as particle motion, velocity or acceleration measurements) may be affected by relatively strong noise and thus, may not be usable for processing purposes. In this case, the prior information of the spatial spectrum may be estimated when applying the matching pursuit-based technique to an intermediate temporal bandwidth, which is high enough to be safe from the noise affecting the particle motion measurements and low enough not to be subject to very high order aliasing. Such estimates may then be used as prior information to determine the spectrum estimate in order to allow a matching pursuit-based technique to de-alias higher frequencies, which are affected by higher order aliasing and also to allow a matching pursuit-based technique to reconstruct lower frequencies that are affected by relatively strong noise and hence, may be otherwise harder to reconstruct correctly. Thus, the techniques that are disclosed herein may be used for purposes of using a matching pursuit-based technique to attenuate noise in measurements, which may otherwise be too noisy at low frequencies to be used for further processing.

In general, an estimate of the energy distribution of the signal in space (an estimate of the spectrum in wavenumber domain) may be determined by analyzing the output signal in the absence of priors in a band-pass interval of the temporal frequency axis. This interval is designed, taking into account the geometry of the acquisition and the SNR on the different components. The bandpass interval used for building the estimate may include frequencies that may be subject to spatial aliasing in a single component scenario.

The estimate of the energy distribution may be derived from a prior knowledge of the seismic wavefield. For example, the energy distribution may be derived from a synthetically generated dataset, which was generated by reproducing the actual acquisition scenario. As another example, the estimate of the energy distribution may be derived from a previous seismic measurement of the signal, which was acquired in a prior seismic survey (a time lapse, or "4-D" survey, for example). Thus, many variations are contemplated and are within the scope of the appended claims.

Figure 4:
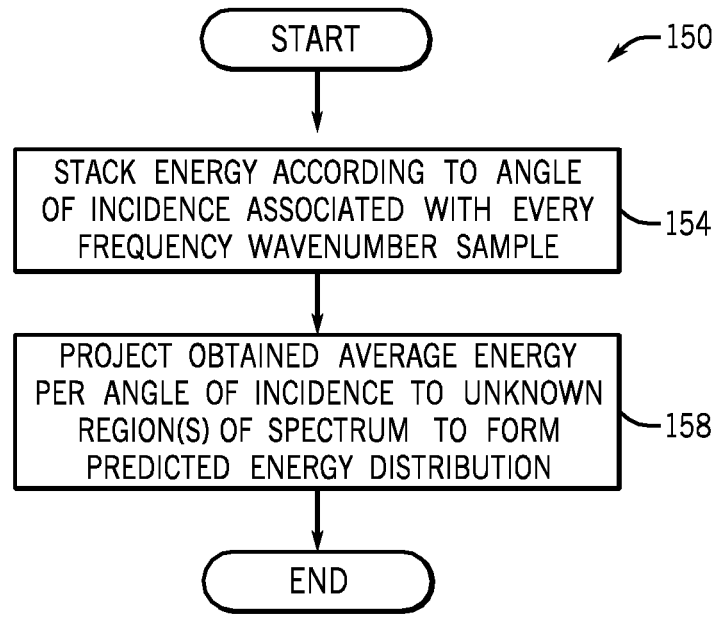
FIG. 4 is a flow diagram depicting a technique to predict an energy distribution for the constructed seismic signal according to an embodiment of the invention.

Referring to FIG. 4, in accordance with some embodiments of the invention, the energy distribution may be predicted according to a technique 150. In general, information from a known region of the frequency-wavenumber domain is extrapolated into an unknown bandwidth. For the multicomponent seismic interpolation problem, the average energy associated to every angle of instance may be used. In this regard, pursuant to the technique 150, after the interpolated spectrum is available in a certain temporal bandwidth, the energy is stacked according to the angle of incidence associated to every frequency wavenumber sample, pursuant to block 154. The result of the process is then used to generate the estimated distribution of energy that is available to support the matching pursuit-based technique in different bandwidths. In this manner, pursuant to the technique 150, the obtained average energy per angle of incidence is projected (block 158) towards the unknown regions of the spectrum to form the predicted energy distribution. The overall process is different and more accurate in principle, than conventional extrapolation techniques that are based on the direct mapping of low frequency-wavenumber components directly towards higher frequency-wavenumber regions.

Figure 5:
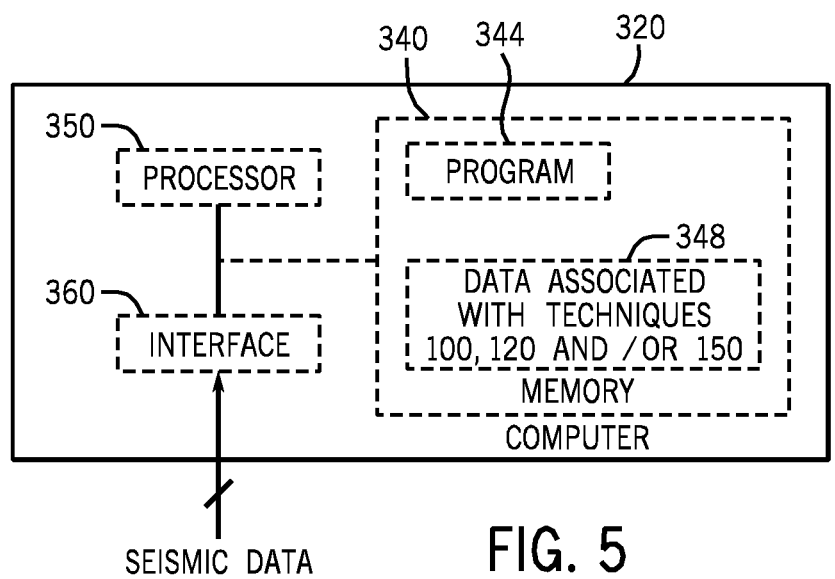
FIG. 5 is a schematic diagram of a data processing system according to an embodiment of the invention.

Referring to FIG. 5, in accordance with some embodiments of the invention, a data processing system 320, or computer, which contains a processor 350 that processes acquired seismic data to perform at least some parts of one or more of the techniques that are disclosed herein for such purposes (as non-limiting examples) as performing an iterative process to determine basis functions for a matching pursuit-based technique to construct a seismic signal; determining a cost function associated with the basis function selection; using a predicted energy distribution to aid in interpreting the cost function to discriminate between false and realistic minimas in the cost function; etc.

In accordance with some embodiments of the invention, the processor 350 may be formed from one or more microprocessors and/or microprocessor processing cores. As non-limiting examples, the processor 350 may be located on a streamer 30 (see FIG. 1), located on the vessel 20 (see FIG. 1), located at a land-based processing facility, etc., depending on the particular embodiment of the invention. Moreover, the data processing system 320 may be a distributed processing system, in accordance with some embodiments of the invention.

As depicted in FIG. 5, the processor 350 may be coupled to a communication interface 360 for purposes of receiving such data as multicomponent input data indicative of sampled seismic input signals (data indicative of pressure, particle motion, particle velocity, and/or acceleration measurements, as just a few non-limiting examples). As examples, the communication interface 360 may be a Universal Serial Bus (USB) interface, a network interface, a removable media interface (a flash card, CD-ROM interface, etc.) or a magnetic storage interface (IDE or SCSI interfaces, as non-limiting examples). Thus, the communication interface 360 may take on numerous forms, depending on the particular embodiment of the invention.

In accordance with some embodiments of the invention, the processor 350 is coupled to a memory 340, which stores program instructions 344, which when executed by the processor 350, may cause the processor 350 to perform various tasks of one or more of the techniques that are disclosed herein, such as the techniques 100, 120 and/or 150, as non-limiting examples. It is noted that the memory 340 is a non-transitory memory and may take on numerous forms, such as semiconductor storage, magnetic storage, optical storage, phase change memory storage, capacitor-based storage, etc., depending on the particular implementation. Furthermore, the memory 340 may be formed from more than one of these non-transitory memories, in accordance with some embodiments of the invention. When executing the program instruction 344, the processor 340 may also, for example, store preliminary, intermediate and/or final results obtained via the execution of the program instructions 344 as data 348 in the memory 340.

It is noted that the data processing system 320 is merely an example of one out of many possible architectures for processing the seismic data in accordance with the techniques that are disclosed herein. Moreover, the data processing system 320 is represented in a simplified form, as the processing system 320 may have various other components (a display to display initial, intermediate or final results of the system's processing, as a non-limiting example), as can be appreciated by the skilled artisan. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
processing seismic data indicative of samples of at least one measured seismic signal in a processor-based machine to, in an iterative process, determine basis functions which represent a constructed seismic signal; and
in each iteration of the iterative process, selecting another basis function of the plurality of basis functions, the selecting comprising:
based at least in part on the samples and a current version of the constructed seismic signal, determining a cost function; and
interpreting the cost function based at least in part on a predicted energy distribution of the constructed seismic signal to select said another basis function.

2. The method of claim 1, wherein the cost function has a magnitude that has a plurality of minimums and the interpreting comprises selectively disregarding one or more of the minimums based on the predicted energy distribution of the constructed seismic signal.

3. The method of claim 1, wherein the cost function is dependent on residual energy determined based on the samples, the current version of the constructed seismic signal and at least one parameter, and the selection of said another basis function comprises selecting said at least one parameter for said another basis function.

4. The method of claim 1, wherein the samples are indicative of multiple channels comprising at least one or more of the following: acceleration measurements, particle velocity measurements, particle motion measurements and pressure measurements.

5. The method of claim 1, wherein the processing comprises using a matching pursuit-based technique to determine the basis functions for the constructed seismic signal.

6. The method of claim 1, wherein the constructed seismic signal comprises a contiguous version of a sampled input signal.

7. The method of claim 1, wherein the constructed seismic signal comprises a filtered contiguous version of a sampled input signal.

8. The method of claim 1, further comprising predicting a higher frequency region of the predicted energy distribution based on an observed lower frequency energy.

9. The method of claim 8, wherein the observed lower frequency energy comprises average energy per angle of incidence.

10. The method of claim 1, further comprising generating the predicted energy distribution, the generating comprising:
based on spectral energy present in a first frequency range of said at least one measured seismic signal, estimating spectral energy in a different second frequency range of the predicted energy distribution.

11. The method of claim 10, wherein the second frequency range comprises a relatively lower frequency range substantially associated with noise, and the first frequency range comprises a relatively higher frequency range not substantially associated with noise.

12. The method of claim 10, wherein the second frequency range comprises a relatively higher frequency range substantially associated with aliasing, and the first frequency range comprises a relatively lower frequency range not substantially associated with aliasing.

13. The method of claim 1, wherein the predicted energy distribution comprises a distribution derived from a priori knowledge of the energy distribution.

14. The method of claim 13, wherein the a priori knowledge comprises an energy distribution derived from a synthetically produced dataset or an energy distribution derived from a previous seismic survey conducted at a time prior to a survey in which said at least one seismic signal was acquired.

15. A method comprising:
processing seismic data indicative of samples of at least one measured seismic signal in a processor-based machine to attenuate noise from said at least one measured seismic signal, said at least one measured seismic signal comprising a lower frequency range substantially associated with noise and the attenuating comprising:
predicting an energy distribution for the constructed seismic signal, the predicting comprising estimating spectral energy in the lower frequency range of the predicted energy distribution based on spectral energy present in a higher frequency range of said at least one measured seismic signal; and
using a matching pursuit-based technique to determine basis functions which represent the constructed seismic signal based at least in part on the predicted energy distribution.

16. A system comprising:
an interface to receive seismic data indicative of samples of at least one measured seismic signal;
a processor adapted to:
process the seismic data in an iterative process to determine basis functions which represent a constructed seismic signal; and
in each iteration of the iterative process, select another basis function of the plurality of basis functions,
wherein the processor is adapted to select said another basis function in each iteration using a technique comprising:
based at least in part on the samples and a current version of the constructed seismic signal, determining a cost function; and
interpreting the cost function based at least in part on a predicted energy distribution of the constructed seismic signal to select said another basis function.

17. The system of claim 16, wherein the cost function has a magnitude that has a plurality of minimums and the processor is further adapted to selectively disregard one or more of the minimums based on the predicted energy distribution of the constructed seismic signal.

18. The system of claim 16, wherein the cost function is dependent on residual energy determined based on the samples, the current version of the constructed seismic signal and a wavenumber, and the processor is further adapted to select a wavenumber value for said another basis function.

19. The system of claim 16, wherein the samples are indicative of multiple channels comprising at least one or more of the following: acceleration measurements, particle velocity measurements, particle motion measurements and pressure measurements.

20. The system of claim 16, wherein the processor is further adapted to predict a higher frequency region of the predicted energy distribution based on an observed lower frequency energy.

21. The system of claim 16, wherein the observed lower frequency energy comprises average energy per angle of incidence.

22. An article comprising a computer readable storage medium to store instructions that when executed by at least one processor cause said at least one processor to:
process seismic data indicative of samples of at least one measured seismic signal in a processor-based machine to, in an iterative process, determine basis functions which represent a constructed seismic signal; and
in each iteration of the iterative process, select another basis function of the plurality of basis functions, the selection of said another basis function comprising:
based at least in part on the samples and a current version of the constructed seismic signal, determining a cost function; and
interpreting the cost function based at least in part on a predicted energy distribution of the constructed seismic signal to select said another basis function.

* * * * *